US007359318B2

(12) United States Patent
Abel et al.

(10) Patent No.: US 7,359,318 B2
(45) Date of Patent: Apr. 15, 2008

(54) METHOD AND SYSTEMS FOR ORDERED DYNAMIC DISTRIBUTION OF PACKET FLOWS OVER NETWORK PROCESSING MEANS

(75) Inventors: Francois Abel, Ruschlikon (CH); Alan Benner, Poughkeepsie, NY (US); Gero Dittmann, Zurich (CH); Andreas Herkersdorf, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/506,101

(22) PCT Filed: Feb. 27, 2003

(86) PCT No.: PCT/EP03/03249

§ 371 (c)(1),
(2), (4) Date: Aug. 30, 2004

(87) PCT Pub. No.: WO03/075520

PCT Pub. Date: Sep. 12, 2003

(65) Prior Publication Data

US 2005/0152354 A1    Jul. 14, 2005

(30) Foreign Application Priority Data

Mar. 5, 2002    (EP) .................................. 02368023

(51) Int. Cl.
*H04J 3/14* (2006.01)
*H04J 1/16* (2006.01)
(52) U.S. Cl. .................................... 370/229; 370/230.1
(58) Field of Classification Search ................ 370/229, 370/230, 230.1, 235, 236; 709/230, 231, 709/234; 718/105
See application file for complete search history.

(56) References Cited

U.S. PATENT DOCUMENTS

2002/0003804 A1 * 1/2002 Hjalmtysson et al. ....... 370/410

(Continued)

FOREIGN PATENT DOCUMENTS

EP    WO 99/07180    7/1998

(Continued)

OTHER PUBLICATIONS

Werner Bux, Wolfgang E. Denzel, Ton Engerbersen, Andreas Herkersdorf and Ronald P Luijten, Technologies and Building Blocks for Fast Packet Forwarding, pp. 70-76, IEEE Communications Magazine, Jan. 2001.

*Primary Examiner*—Ajit Patel
(74) *Attorney, Agent, or Firm*—Douglas W. Cameron

(57) ABSTRACT

A method and systems for dynamically distributing packet flows over multiple network processing means and recombining packet flows after processing while keeping packet order even for traffic wherein an individual flow exceeds the performance capabilities of a single network processing means is disclosed. After incoming packets have been analyzed to identify the flow the packets are parts of, the sequenced load balancer of the invention dynamically distributes packets to the connected independent network processors. A balance history is created per flow and updated each time a packet of the flow is received and/or transmitted. Each balance history memorizes, in time order, the identifier of network processor having handled packets of the flow and the associated number of processed packets. Processed packets are then transmitted back to a high-speed link or memorized to be transmitted back to the high-speed link later, depending upon the current status of the balance history.

10 Claims, 3 Drawing Sheets

U.S. PATENT DOCUMENTS

2004/0062246 A1* 4/2004 Boucher et al. ............ 370/392
2004/0228274 A1* 11/2004 Yazaki et al. ............... 370/229
2006/0159019 A1* 7/2006 Buskirk et al. ............. 370/235
2007/0091893 A1* 4/2007 Yazaki et al. ............... 370/392
2007/0110045 A1* 5/2007 Shinohara ................... 370/386

FOREIGN PATENT DOCUMENTS

EP    WO 01/05086 A2    7/2000

* cited by examiner

METHOD AND SYSTEMS FOR ORDERED DYNAMIC DISTRIBUTION OF PACKET FLOWS OVER NETWORK PROCESSING MEANS

FIELD OF THE INVENTION

The present invention relates to the field of network processing where packets traversing a packet switching network are analyzed by network processing means, and more specifically to a method and systems for dynamically distributing packet flows over multiple network processing means and recombining packet flows after processing while keeping packet order, even for traffic wherein an individual flow exceeds the performance capabilities of a single network processing means.

BACKGROUND OF THE INVENTION

In network processing systems, packets traversing switching network are generally analyzed by network processors that execute functions on the packets including routing, segmentation and re-assembly, filtering and virus scanning, to increase performance, security and service quality. However, due to the increasing complexity of operation types that network processors may be required to execute on packets, and the increasing rate of bandwidth and packet rate transmission increase in relation to the rate of increase of network processor processing power, it is essential for devices and methods to increase the overall processing performance of network processors accordingly.

A common method for achieving higher processing performance than a single processor or network processor can provide consists in parallel processing, where multiple processors operate in parallel. Such multiple processors may be considered as a single network processor of higher speed.

In the context of network processing, parallel processing has, in prior art, been implemented as load balancing, or channel striping. Prior art channel striping (also known as load sharing or inverse multiplexing) is frequently used in networking because of processing bottlenecks or simply because of price/performance ratio. In that scheme, a Round-Robin Algorithm or a Load Sharing Algorithm is used that stripes the packets belonging to a stream across multiple channels. A major problem with striping is that packets may be mis-ordered due to different delays on different channels and due to different packet sizes. Three types of solutions for this mis-ordering problem are known in the prior art:
  i) keeping each flow on only one channel and accepting that a single flow cannot use more bandwidth than each channel can support,
  ii) reordering the received packets after mis-ordering and accept the resulting waste of processing bandwidth, and
  iii) splitting packets up into fixed transfer units which the network processing means can process in a predictable period of time.

Dynamic load balancing, on the other hand, is commonly used in the field of computational parallel processing, dealing with three general computing entities: computations, tasks and data. In these cases, dynamic load balancing tries to find the mapping of computations, tasks or data, to computers that results in each computer having an approximately equal amount of work in order to reduce run time and increase the overall efficiency of a computation.

U.S. patent application Ser. No. 09/551,049 assigned to IBM Corporation and filed before the United States Patent and Trademark Office on Apr. 18, 2000, describes a real-time load-balancing system for distributing a sequence of incoming data packets emanating from a high speed communication line to a plurality of processing means, each operating at a capacity that is lower than the capacity of the high speed communication line. The system comprises parser means capable of extracting a configurable set of classifier bits from the incoming packets for feeding into compression means. The compression means are capable of reducing a bit pattern of length K to a bit pattern having a length L which is a fraction of K. This system further comprises a pipeline block for delaying incoming packets until a load balancing decision is found, and an inverse demultiplexer for receiving a port identifier output from said compression means as selector and for directing pipelined packets to the appropriate output port.

However, there is still a need for preserving the correct sequencing of flows, particularly for traffic wherein an individual flow exceeds the performance capability of a single network processor. Ordered recombination of packet flows is straightforward if the packets can be modified. An obvious method would be to label each incoming packet with a sequence number, and to only prevent output packets from exiting in non-sequential order. However, the disadvantage of packet modification is that the individual network processors must be configured differently in an aggregated configuration than in single network processor configuration, to correctly process the modified packets.

If such a need is requested by current technical performances of network processing means, it also allows reuse of previous generations of network processing means by merging their performances to reach the desired one and thus, to optimize cost of such network processing means.

SUMMARY OF THE INVENTION

Thus, it is a broad object of the invention to remedy the shortcomings of the prior art as described here above.

It is another object of the invention to provide a method and systems for dynamically distributing packet flows over multiple network processing means and recombining packet flows after processing while keeping packet order even for traffic wherein an individual flow exceeds the performance capabilities of a single network processing means, without modifying the packets or modifying the operation of each single network processing means.

It is a further object of the invention to provide a method and systems for dynamically distributing packet flows over multiple network processing means having different processing powers and recombining packet flows after processing while keeping packet order even for traffic wherein an individual flow exceeds the performance capabilities of a single network processing means.

The accomplishment of these and other related objects is achieved by a method for ordered dynamic distribution of packet flows from a high-speed link over network processing means that comprises the steps of:
  parsing the header of an incoming packet to extract flow identifier;
  creating a balance history associated to said flow identifier if it does not exist;
  analyzing network processing means loading and setting a current network processing means;
  if the identifier of said current network processing means is different than the one having previously processed at least one packet of the same flow, memorizing said identifier of said current network processing means in said balance history and setting to one the number of packets processed by said current network processing means in said balance history;

else if the identifier of said current network processing means is the same as the one having previously processed at least one packet of the same flow, increasing the number of packets processed by said current network processing means in said balance history; and, routing said incoming packet to said current network processing means, and by a method to recombine packets processed by a plurality of network processing means according to the method as described above, comprising the steps of:

parsing the header of a processed packet to extract flow identifier;

getting the earliest network processing means identifier and associated number of processed packets from the balance history related to said flow identifier;

if said processed packet has not been processed by the earliest network processing means, it is stored in a packet memory;

else if said processed packet has been processed by the earliest network processing means, said processed packet is transmitted to the high-speed link, said associated number of processed packets is decremented and, if said associated number of processed packets reaches zero, earliest network processing means identifier changes to the next in said balance history and packets queued in said packet memory corresponding to the new earliest network processing means identifier may be transmitted to the high-speed link and then removed from said packet memory.

Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

Figures 1, 3:
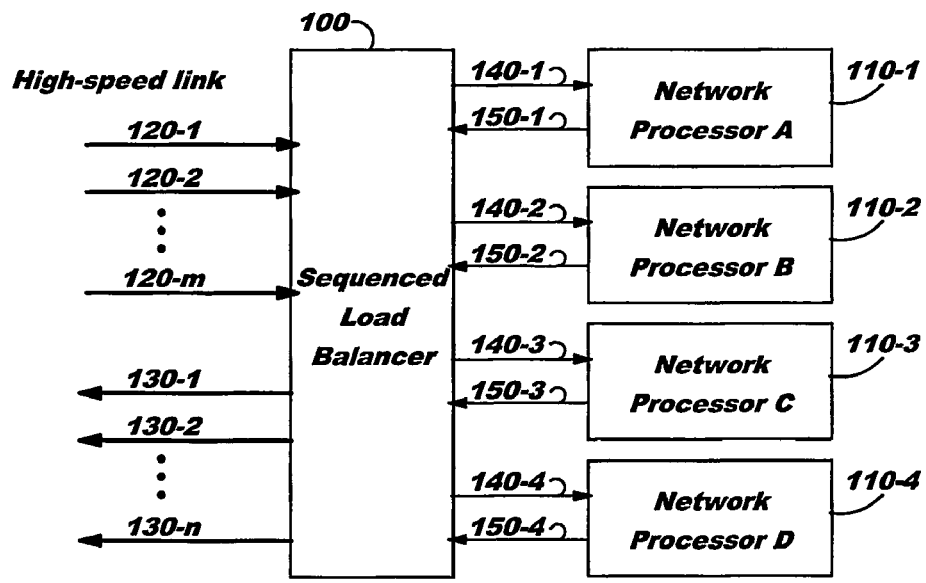
FIG. 1 depicts a network processing system illustrating the use of a sequenced load balancer according to the invention.
FIG. 3 illustrates the content of balance history memory.

FIG. 1 depicts a network processing system illustrating the use of a sequenced load balancer according to the invention to distribute the traffic flows of an aggregate high-speed link onto a multiplicity of independent network processing entities. In this example, the network processing system comprises a sequenced load balancer device 100 according to the invention and four independent network processors A to D, referred to as 110-1 to 110-4, respectively. It is to be understood that sequenced load balancer device 100 may be connected to more or less than four network processors, this system scheme being described for sake of illustration. A high-speed link consisting in incoming and outgoing ports (generically referred to as 120 and 130 respectively) transmits/receives packet flows to/from sequenced load balancer device 100 so as to exchange data with a network or a network device such as a switching fabric, not represented for sake of clarity. Incoming and outgoing ports 120-i and 130-j (i=1, . . . , m, j=1, . . . , n) may handle similar or different types of data. Likewise, incoming and outgoing ports 120-i and 130-j may be connected to different types of networks or network devices depending upon requested data processing, e.g. routing or filtering. The number of incoming ports 120 may be equal to the number of outgoing ports 130 (n=m) or different (n≠m). The system further comprises connections 140-k and 150-k (k=1, . . . , 4) to exchange packets between sequenced load balancer device 100 and independent network processor k.

Network processing system illustrated on FIG. 1 allows to process packet flows of a high-speed link with independent network processors having packet processing rates being less than the packet transmission rate of the high-speed link. To that end, sequenced load balancer device 100 analyzes the incoming packet flows and dynamically distributes packets to the connected independent network processors. After processing, packets are recombined in sequenced load balancer 100 so as to be transmitted back to the high-speed link, preserving ordering of all packet flows.

According to the method of the invention, each incoming packet is analyzed so as to determine corresponding flow identifier and a network processing means is assigned to process this incoming packet according to network processing means load. A balance history is created per flow to memorize the sequence of used network processing means and the corresponding number of processed packets. When packets processed by a network processing means are transmitted back to the high-speed link, the identifier of this network processing means and the associated number of processed packets are removed from the balance history. Thus, the algorithm that handles incoming data comprises the steps of:

parsing the header of an incoming packet to extract a flow identifier;

hashing the extracted flow identifier to generate a different identifier, referred to as a flow bucket identifier;

determining the current network processing identifier by analyzing the load of network processing means;

if the current network processing identifier is the same as the one having previously processed at least one packet of the same flow, increasing the number of packets being processed by the current network processing means recorded in the balance history memory;

else if the current network processing identifier is different than the one having previously processed at least one packet of the same flow, memorizing the current network processing identifier in the balance history memory and setting to one the number of packets processed by the current network processing means; and, routing packet to the current network processing means.

After incoming packets have been processed, it is necessary to recombine them before transmitting them back to the high-speed link. Thus, each processed packet is analyzed so as to determine corresponding flow identifier and the corresponding balance history is used to respect packet ordering. Processed packets may be bufferized if earlier packets of the same flow have not been yet processed. After packets have been transmitted back to the high-speed link, balance history is updated and the buffer is released. The algorithm that handles processed data comprises the steps of:
- parsing the header of a processed packet to extract the flow identifier;
- hashing the extracted flow identifier to generate the corresponding flow bucket identifier;
- getting the earliest network processing means identifier and associated number of processed packets for that flow bucket from the balance history memory;
  - if packet has not been processed by the earliest network processing means recorded for its flow bucket, it is stored in a packet memory;
  - else if packet has been processed by the earliest network processing means, it is transmitted to the high-speed link, the associated number of processed packets is decremented and, if this associated number of processed packets reaches zero, earliest network processing means identifier changes to the next in the balance history and packets queued in packet memory corresponding to the new earliest network processing means identifier may be transmitted to the high-speed link and then removed from the packet memory.

Figure 2:
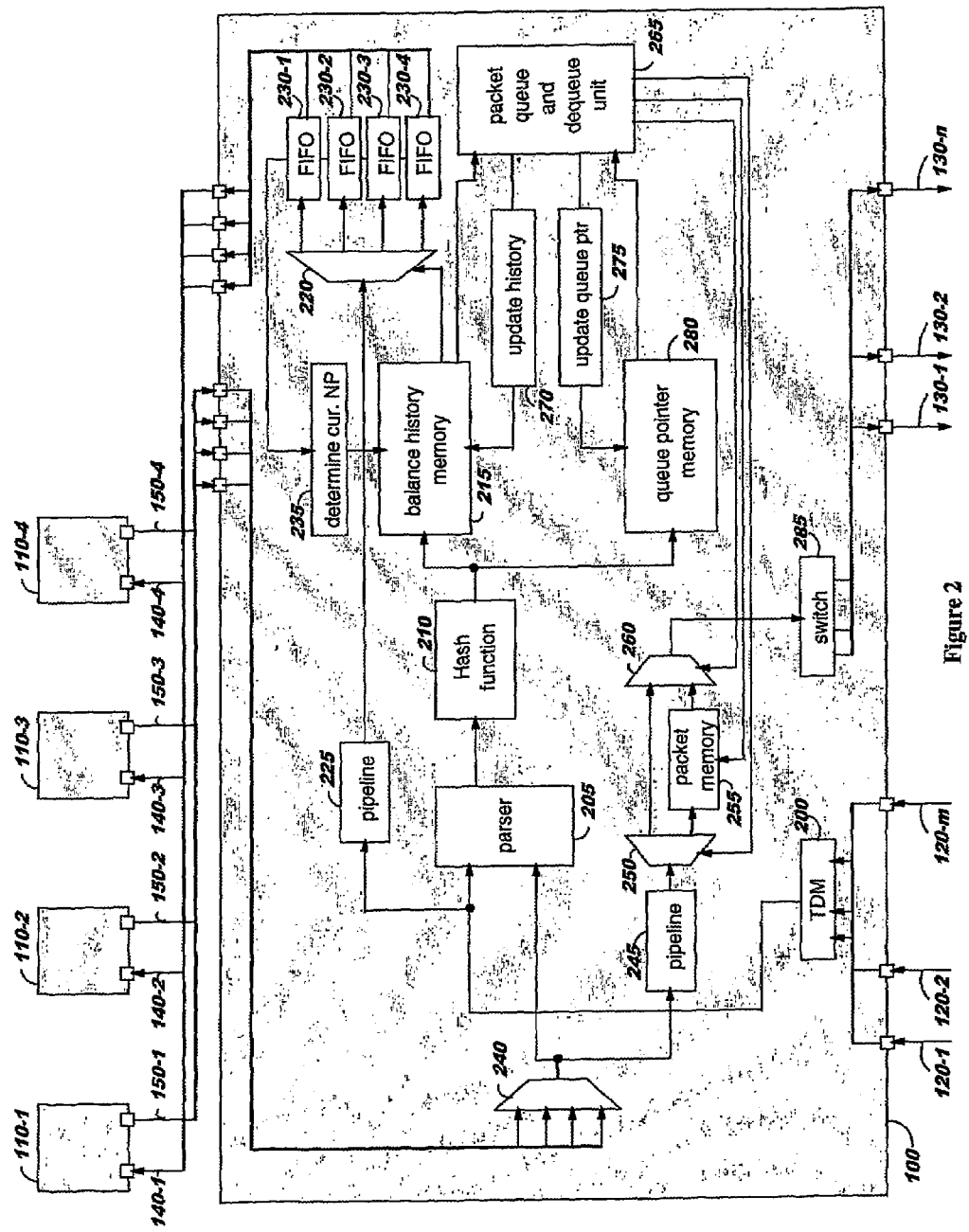
FIG. 2 illustrates an architecture example of the system of the invention for dynamically distributing packet flows over network processing means.

FIG. 2 illustrates the architecture of a sequenced load balancer device 100 for dynamically distributing packet flows over network processing means according to the method described above. Sequenced load balancer device 100 comprises a high-speed link consisting of incoming and outgoing ports 120-i (i=1, . . . , m) and 130-j (j=1, . . . , n), respectively, and connections 140-1 to 140-4 and 150-1 to 150-4 to transmit/receive packets to/from network processors 110-1 to 110-4, respectively. Again, it is to be understood that sequenced load balancer device 100 may be connected to more or less than four network processors, this implementation example being described for sake of illustration.

The receive side of sequenced load balancer device 100 consists of Time Division Multiplexing (TDM) unit 200, header parsing unit 205, hash function unit 210, balance history memory 215, demultiplexer unit 220, pipeline unit 225, FIFO memory units 230-1 to 230-4 and current network processor determining unit 235. Packets arriving on the incoming ports 120 of the high-speed link are combined in TDM unit 200 according to standard TDM algorithm and then examined by sequenced load balancer device 100. Each packet is routed to one of the several network processors 110-1 to 110-4, based on the packet type, which flow the packet is part of, and the amount of current load on each of the network processors 110-1 to 110-4. Incoming packet headers are parsed in header parsing unit 205 so as to extract flow identifiers that are transmitted to hash function unit 210 wherein flow identifiers are hashed to generate different identifiers, referred to as flow bucket identifiers. Hash function unit 210 ascertains that packets belonging to a same flow are identified with identical flow bucket. In general, the hashing function will be configured such that the number of flow bucket identifiers is significantly less than the number of possible flow identifiers, but this is not a requirement of the invention.

The parser unit 205 should be capable of providing flexibility in terms of number and types of extracted flow identifiers and of ensuring a broad applicability for various protocols. A preferred embodiment of the parser unit 205 is a re-configurable finite state machine device.

Flow buckets are used as indexes in balance history memory 215 wherein a current network processor identifier is assigned to current packet. The identifiers of all the network processors having handled packets of a same flow and the associated number of packets processed are stored, in processing time order, with associated flow bucket in balance history memory 215.

FIG. 3 illustrates the content of balance history memory 215 wherein each row of the table represents the processing history of a flow. First column, referred to as 300, identifies the flows by means of flow buckets as discussed above, while other columns represent network processor identifier and associated number of processed packets, referred to as 305-i and 310-i respectively. Thus, column 305-1 represents the last current network processor identifier for each active flow and column 310-1 the associated number of processed packets, column 305-2 represents the previous current network processor identifier for each active flow and column 310-2 the associated number of processed packets, and so on. An active flow bucket is defined as a flow bucket wherein at least one packet has not been transmitted back to the output port 130. In the example shown in FIG. 3, 125 packets belonging to flow having a flow bucket equal to 6302 are being processed by current network processor having identifier equal to 1 and 265 packets of this flow bucket have been previously processed by network processor having identifier equal to 2.

Now turning back to FIG. 2, current network processor identifier is transmitted to demultiplexer unit 220 so that current received packet being delayed in pipeline unit 225 is stored in the FIFO memory (230-1 to 230-4) corresponding to current network processor identifier, from which it is transmitted to the current network processor. Current network processor determining unit 235 set current network processor by determining activity of network processors 110-1 to 110-4 through load analysis of FIFO memories 230-1 to 230-4 by means of standard statistical techniques. For example, a network processor may be set as current network processor each time the loading of its associated FIFO memory is less than a predetermined threshold. Another example of determining current network processor consists in selecting the network processor that associated FIFO memory is just about to be empty, in such case the sequenced load balancer will not be switching between network processors very often. It is also possible to use flow histories to optimize selection of current network processor.

It is to be noticed that sequenced load balancer 100 may be connected to network processors having different processing powers without any modification since even if a network processor having a greater processing power than others empties its associated FIFO memory faster, sequenced load balancer 100 selects it more often as current network processor because current network processor is determined according to FIFO memory loading. Another solution requiring modification of sequenced load balancer 100 consists in storing the processing power of each network processor in current network processor determining unit 235 with associated network processor identifier. Processing power and associated network processor identifier are used in conjunction with FIFO memory (230-1 to 230-4) load to determine current network processor so as to optimize loading of network processing means.

The transmit side of sequenced load balancer device 100 consists of multiplexer unit 240, pipeline unit 245, demultiplexer unit 250, packet memory 255, multiplexer unit 260 and switching unit 285. After packets have been processed in network processors 110-1 to 110-4, they are transmitted to pipeline unit 245 through multiplexer unit 240 and then to demultiplexer unit 250. Depending upon packet flow status, incoming packets are stored in packet memory 255 or transmitted to multiplexer unit 260 to be outputted through switching unit 285. Switching unit 285 analyzes packet headers to determine outgoing port 130-j of high-speed link to which packets have to be sent.

Sequenced load balancer device 100 further comprises a data flow control to recombine packets after processing, comprising header parsing unit 205, hash function unit 210, balance history memory 215, packet queue and dequeue unit 265, update history unit 270, update queue pointer unit 275 and queue pointer memory 280. It is to be noticed that header parsing unit 205, hash function unit 210 and balance history memory 215 are used to analyze packets before and after processing. After packets have been processed in network processors 110-1 to 110-4, they are transmitted to header parsing unit 205 through multiplexer unit 240. Processed packet headers are parsed so as to extract flow identifiers that are transmitted to hash function unit 210 wherein flow identifiers are hashed to generate flow buckets.

Flow bucket identifier is used as an index in balance history memory 215 to access balance history that is used by packet queue and dequeue unit 265 to determine whether a processed packet has to be transferred to outgoing port 130-j or needs to be memorized in packet memory 255. Flow bucket identifier is also used as an index to store packet pointer in queue pointer memory 280 when a processed packet needs to be stored in or retrieved from packet memory 255.

Packet queue and dequeue unit 265 analyzes balance history received from balance history memory 215 to compare the identifier of network processor having processed current packet with the one of the earliest network processor of the flow bucket of which current packet is part. If they are not equal, current processed packet is stored in packet memory 255 and corresponding pointer is stored in queue pointer memory 280 according to current processed packet flow bucket and the identifier of the network processor having processed current processed packet. If identifiers are equal, current processed packet is directly transmitted to outgoing port 130-j and the packet queue and dequeue unit 265 decreases the number of processed packets associated to the earliest network processor identifier through update history unit 270. If this number reaches zero, the identifier of the earliest network processing means is also updated, it is set to the next in the balance history and packets queued in packet memory corresponding to the new earliest network processing means identifier may be transmitted to the high-speed link and then removed from the packet memory.

It is to be noticed that if the number of incoming ports 120 is equal to one, then Time Division Multiplexing unit 200 is not required. Likewise, if the number of outgoing ports 130 is equal to one, switching unit 285 is not required.

Figure 4:
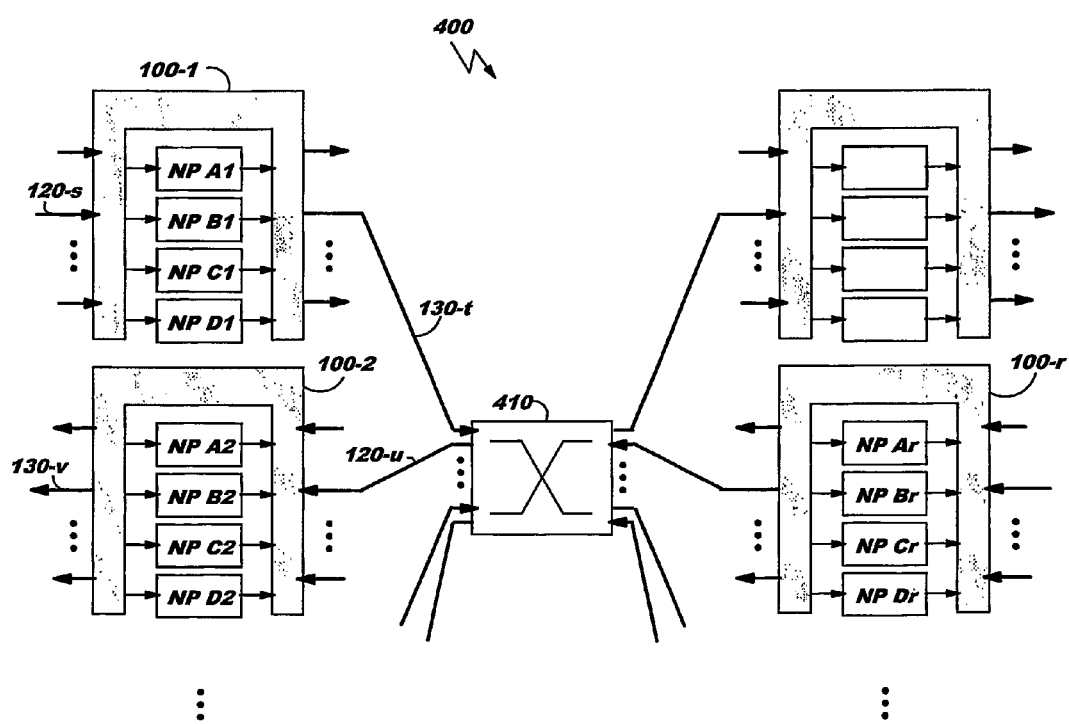
FIG. 4 describes a network switching system comprising processing systems based on sequenced load balancers according to the invention.

FIG. 4 illustrates the use of several sequenced load balancers 100, as described above, in a high-end switching or router system 400. Such system typically comprises at least one switching fabric 410, having a plurality of high-speed links, e.g. 64×64 port switch with each port capable of sustaining a full duplex 40 Gb/s traffic. In this example, four network processors are required to handle a single half duplex high-speed link, i.e. an incoming or outgoing port. Thus, switching system 400 comprises as many sequenced load balancers, generically referred to as 100-r, as half duplex links wherein each sequenced load balancer 100-r connects four network processors, NP Ar, NP Br, NP Cr and NP Dr. The shape of sequenced load balancers is shown in "U" shape in order to simplify the overall drawing and to clarify how the aggregation of sequenced load balancers and network processing means appears to the rest of the system as a single network processing means of higher power.

To illustrate the behavior of the system presented on FIG. 4, let us consider a particular packet flow received in sequenced load balancer 100-1 through incoming port 120-s. Packets of this flow are dynamically distributed over network processors NP A1, NP B1, NP C1 and NP D1, according to the method of the invention, to be processed. Then, packets are recombined in sequenced load balancer 100-1, keeping packet order, to be transmitted to switching fabric 410 through outgoing port 130-t. Packets are routed in switching fabric 410 and transmitted, for example, to incoming port 120-u of sequenced load balancer 100-2. Again, packets are dynamically distributed over network processors NP A2, NP B2, NP C2 and NP D2 of sequenced load balancer 100-2, still according to the method of the invention, to be processed before being recombined in sequenced load balancer 100-2, still keeping packet order, to be transmitted to a network or network device (not represented) through outgoing port 130-v.

While the invention has been described in term of preferred embodiments, those skilled in the art will recognize that the invention can be implemented differently. Likewise, in order to satisfy local and specific requirements, a person skilled in the art may apply to the solution described above many modifications and alterations all of which, however, are included within the scope of protection of the invention as defined by the following claims.

The invention claimed is:

1. A method for ordered dynamic distribution of packet flows from a high-speed link over network processors that comprises the steps of:
    parsing the header of an incoming packet to extract a flow identifier;
    creating a balance history associated with said flow identifier;
    determining a current network processor by analyzing network processor loading;
    if an identifier of said current network processor is different than the one having previously processed at least one packet of the same flow, storing said identifier of said current network processor in said balance history and setting to one the number of packets processed by said current network processor in said balance history;
    else if said identifier of said current network processor is the same as the one having previously processed at least one packet of the same flow, increasing the number of packets processed by said current network processor in said balance history; and,
    routing said incoming packet to said current network processor.

2. The method of claim 1 wherein said step of routing said incoming packet to said current network processor comprises:
    storing said incoming packet into a memory associated with said current network processor; and,
    transmitting packets stored in said memory associated with said network processor upon request of said network processor.

3. The method of claim 2 wherein said step of analyzing network processor loading and setting a current network processor comprises:
    analyzing the loading of said memory associated to said network processor; and, setting said current network processor according to the loading of said memory associated to said network processor.

4. The method of of claim 1 further comprising the step of time domain multiplexing incoming packets received through a multiplicity of incoming ports.

5. A method to recombine packets processed by a plurality of network processors according to the method as recited in claim 1, comprising:

getting the earliest network processor identifier and associated number of processed packets from the balance history related to said flow identifier;

if said processed packet has not been processed by the earliest network processor, it is stored in a packet memory;

else if said processed packet has been processed by the earliest network processor, said processed packet is transmitted to the high-speed link, said associated number of processed packets is decremented and, if said associated number of processed packets reaches zero, said earliest network processor identifier changes to the next network processor identifier in said balance history and packets queued in said packet memory corresponding to the new earliest network processor identifier may be transmitted to the high-speed link and then removed from said packet memory.

6. The method of claim 5 further comprising the step of switching processed packets over a plurality of outgoing ports according to packet headers.

7. The method of claim 1 further comprising the step of hashing said extracted flow identifiers to generate other identifiers such that said other identifiers are identical for packets belonging to a same flow.

8. The method of claim 7 wherein said other identifiers are smaller than said extracted flow identifiers.

9. The method of claim 8 wherein said step of hashing said extracted flow identifier to generate a smaller identifier is based on a non-linear hashing function.

10. A sequenced load balancer for ordered dynamic distribution of packet flows from a high-speed link over network processors, said load balancer comprising:

a parser for parsing the header of an incoming packet to extract a flow identifier;

a processor for creating a balance history with said flow identifier;

a processor for determining a current network processor by analyzing network processor loading;

a processor for, if an identifier of said current network processor is different than the one having previously processed at least one packet of the same flow, storing said identifier of said current network processor in said balance history and setting to one the number of packets processed by said current network processor in said balance history, said processor also for, else if the identifier of said current network processor is the same as the one having previously processed at least one packet of the same flow, increasing the number of packets processed by said current network processor in said balance history; and a router for routing said incoming packet to said current network processor.

* * * * *